United States Patent
Kummer et al.

(10) Patent No.: US 8,620,506 B2
(45) Date of Patent: Dec. 31, 2013

(54) METHOD AND SYSTEM FOR THERMAL MANAGEMENT OF A HIGH VOLTAGE BATTERY FOR A VEHICLE

(75) Inventors: Andy Kummer, South Lyon, MI (US);
Scott Wojtkowicz, Livonia, MI (US);
Brian Gillespey, Brownstown, MI (US);
Jeffrey R. Grimes, Canton, MI (US);
Kimberley King, Northville, MI (US);
Neil Robert Burrows, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/453,033

(22) Filed: Apr. 23, 2012

(65) Prior Publication Data
US 2013/0166119 A1 Jun. 27, 2013

Related U.S. Application Data

(60) Provisional application No. 61/578,836, filed on Dec. 21, 2011.

(51) Int. Cl.
*B60L 15/20* (2006.01)
*H01M 10/50* (2006.01)
*B60H 1/00* (2006.01)

(52) U.S. Cl.
USPC .......... 701/22; 180/65.1; 180/65.21; 318/139

(58) Field of Classification Search
USPC .................. 701/22; 180/65.1, 65.21; 318/139
See application file for complete search history.

(56) References Cited

U.S. PATENT DOCUMENTS

| | | | |
|---|---|---|---|
| 8,415,041 B2 * | 4/2013 | Eisenhour | 429/62 |
| 2008/0275600 A1 * | 11/2008 | Rask et al. | 701/22 |
| 2009/0020620 A1 | 1/2009 | Douarre | |
| 2009/0071178 A1 | 3/2009 | Major et al. | |
| 2010/0100266 A1 | 4/2010 | Yoshinori et al. | |
| 2011/0153140 A1 | 6/2011 | Datta et al. | |

* cited by examiner

*Primary Examiner* — Mary Cheung
*Assistant Examiner* — Brian P Sweeney
(74) *Attorney, Agent, or Firm* — Brooks Kushman P.C.; David Kelley (57) ABSTRACT

A method for thermal management of an electric vehicle and the vehicle are provided. A controller is configured to regulate the temperature of a traction battery to within an operating temperature range when the vehicle is operating. The temperature of the battery is regulated to within a charging temperature range when the battery is connected to the charger and power source and the ambient temperature is outside an environmental temperature range. The battery is preconditioned to a battery drive temperature when the ambient temperature is outside the environmental temperature range and the battery is connected to the charger and power source. The cabin in the vehicle is preconditioned to a cabin temperature when the vehicle is connected to the charger and power source and the ambient temperature is outside the environmental temperature range.

15 Claims, 6 Drawing Sheets

METHOD AND SYSTEM FOR THERMAL MANAGEMENT OF A HIGH VOLTAGE BATTERY FOR A VEHICLE

CROSS-REFERENCE TO RELATED APPLICATIONS

This application claims the benefit of U.S. provisional Application No. 61/578,836 filed Dec. 21, 2011, the disclosure of which is incorporated in its entirety by reference herein.

TECHNICAL FIELD

Various embodiments relate to a method and a system for thermal management of a high voltage traction battery in a vehicle by heating or cooling the battery to regulate the temperature.

BACKGROUND

Vehicles such as battery electric vehicles (BEV) contain a battery, such as a high voltage battery, to act as an energy source for the vehicle. The battery performance, including capacity and cycle life can change depending on the operating temperature of the battery. It may be desirable to maintain the battery within a specified temperature range while the vehicle is operating or while the vehicle is charging.

In a BEV, energy from the battery is used to regulate the battery temperature when the vehicle is operating and not connected to a charger and power source. Battery energy is also used to operate the heating, ventilation, and air conditioning (HVAC) system.

SUMMARY

In one embodiment, a method for thermal management of an electric vehicle is provided. The method detects if a traction battery is connected to a charger and power source. The temperature of the battery is regulated to be within an operating temperature range when the vehicle is operating. The temperature of the battery is regulated to be within a charging temperature range when the battery is connected to the charger and power source and the ambient temperature is outside an environmental temperature range. The battery is preconditioned to a battery drive temperature when the ambient temperature is outside the environmental temperature range and the battery is connected to the charger and power source. The cabin in the vehicle is preconditioned to a cabin temperature when the vehicle is connected to the charger and the ambient temperature is outside the environmental temperature range.

In another embodiment, a method for thermal management of an electric vehicle connected to a charger and power source is provided. The temperature of a traction battery is regulated to within a charging range when the ambient temperature is outside an environmental range. The battery is preconditioned to a battery drive temperature when the ambient temperature is outside the environmental temperature range. The cabin is preconditioned to a cabin temperature at a predetermined time before vehicle operation.

In yet another embodiment, an electric vehicle is provided with a traction battery, a temperature sensor for the battery, a thermal cycle connected to the battery and having a thermal source and a thermal sink, and a controller. The controller is connected to the battery, the sensor, and the thermal cycle. The controller is configured to (i) measure a battery temperature using the sensor, (ii) detect if the battery is connected to a charger and power source, and (iii) charge the battery when the battery is connected to the charger and power source and a state of charge is less than a threshold. The controller is configured to (iv) regulate the temperature of the battery to be within a charging temperature range when the battery is connected to the charger and power source and the ambient temperature is outside an environmental temperature range. The controller is also configured to (v) precondition the battery to a battery drive temperature when the ambient temperature is outside the environmental temperature range.

Various embodiments according to the present disclosure have associated advantages. Regulating the battery temperature permits both a larger amount of energy to be stored in the battery when charging and more available energy from the battery when operating due to the battery chemistry. Conditioning the battery to a specified temperature while the vehicle is charging causes higher energy efficiency later for the vehicle as less battery energy may be needed to thermally manage the battery and more may be directed for propulsion, thereby extending the vehicle range. Conditioning the cabin to a specified temperature while the vehicle is charging causes higher energy efficiency later for the vehicle as less battery energy may be needed to heat or cool the cabin and more may be directed to propelling the vehicle, also increasing the vehicle range.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
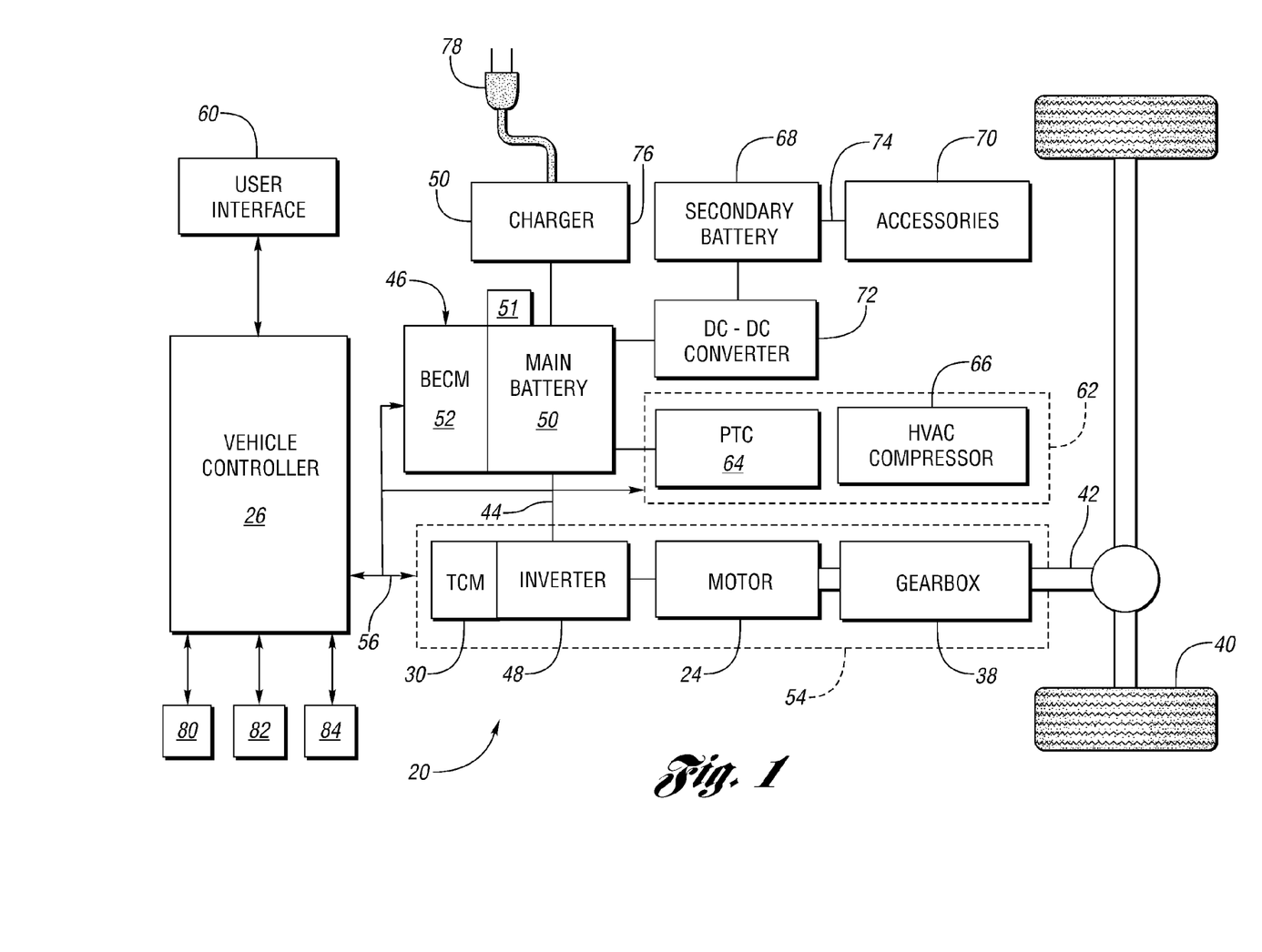
FIG. 1 is a schematic of a battery electric vehicle according to an embodiment.

With reference to FIG. 1, an electric vehicle 20, such as a battery electric vehicle (BEV), is illustrated in accordance with one or more embodiments. FIG. 1 represents only one type of BEV architecture, and is not intended to be limiting. The present disclosure may be applied to any suitable BEV.

The vehicle 20, or BEV, is an all-electric vehicle propelled through electric power, such as by an electric motor 24, and without assistance from an internal combustion engine. The motor 24 receives electrical power and provides mechanical rotational output power. The motor 24 is connected to a gearbox 38 for adjusting the output torque and speed of the motor 24 by a predetermined gear ratio. The gearbox 38 is connected to a set of drive wheels 40 by an output shaft 42. Other embodiments of the vehicle 22 include multiple motors (not shown) for propelling the vehicle 22. The motor 24 may also function as a generator for converting mechanical power into electrical power. A high voltage bus 44 electrically connects the motor 24 to an energy storage system 46 through an inverter 48.

The energy storage system 46 includes a main battery 50 and a battery energy control module (BECM) 52, according to one or more embodiments. The main battery 50 is a high voltage battery, or traction battery, that may output electrical power to operate the motor 24. The main battery 50 is a battery pack made up of one or more battery modules (not shown). Each battery module may contain one battery cell or a plurality of battery cells. The battery cells are heated and cooled using a fluid coolant system, air coolant system, or other coolant method as is known in the art. The BECM 52 acts as a controller for the main battery 50. The BECM 52 also includes an electronic monitoring system that manages temperature and state of charge of each of the battery cells. The battery 50 has at least one temperature sensor 51, such as a thermistor or the like. The sensor 51 is in communication with the BECM 52 to provide temperature data regarding the battery 50.

The motor 24, the transmission control module (TCM) 30, the gearbox 38, and the inverter 48 are collectively referred to as a transmission 54. The vehicle controller 26 communicates with the transmission 54, for coordinating the function of the transmission 54 with other vehicle systems. The controller 26, BECM 52, and TCM 30 are illustrated as separate controller modules. The control system for the vehicle 20 may include any number of controllers, and may be integrated into a single controller, or have various modules. Some or all of the controllers may be connected by a controller area network (CAN) or other system. The control system may be configured to control operation of the various components of the transmission 54 and the battery 50 under any of a number of different conditions, including in a way that thermally manages the temperature in the battery 50 and the vehicle cabin or passenger compartment, and for charging and discharging operations of the battery 50.

The TCM 30 is configured to control specific components within the transmission 54, such as the motor 24 and/or the inverter 48. The vehicle controller 26 monitors the temperature of the motor 24 and receives a throttle request (or desired motor torque request) from the driver. Using this information the vehicle controller 26 provides a motor torque request to the TCM 30. The TCM 30 and the inverter 48 convert the direct current (DC) voltage supply by the main battery 50 into signals that are used to control the motor 24 in response to the motor torque request.

The vehicle controller 26 provides information to the driver through a user interface 60. The user interface may include features that permit a user to enter requirements or desired operating or charging parameters of the vehicle, or other vehicle operating parameters into the controller 26. The user interface may include a touch screen interface, a wireless connection to a remote station, such as a mobile device or computer, and other input interfaces as are known in the art. The vehicle controller 26 also receives input signals that are indicative of current operating conditions of vehicle systems. For instance, the vehicle controller 26 may receive input signals from the BECM 52 that represent battery 50 conditions, and input signals from the transmission 54, that represent motor 24 and inverter 48 conditions. The vehicle controller 26 provides output to the user interface 60, such as a motor status or charge level status, which is conveyed visually to the driver.

For example, the user may input a departure time, desired cabin temperature at departure, or the like, using the user interface 60, or to an interface in communication with the charger 76. Alternatively, the controller 26 may include a probabilistic or other logic module that determines a user's driving habits, including trip lengths, trip paths, departure times, cabin climate preferences, etc. The controller 26 arbitrates between the various user requests to thermally manage the vehicle 20 both on-charge and while operating.

The vehicle 22 includes a climate control system 62 for heating and cooling various vehicle components. The climate control system 62 includes a high voltage positive temperature coefficient (PTC) electric heater 64 and a high voltage electric HVAC compressor 66, according to one or more embodiments. The PTC 64 and HVAC compressor 66 are used to heat and cool fluid, respectively, that circulates to the transmission 54 and to the main battery 50. Both the PTC 64 and the HVAC compressor 66 may draw electrical energy directly from the main battery 50. The climate control system 62 may include a controller (not shown) for communicating with the vehicle controller 26 over the CAN bus 56 or may be integrated into the controller 26. The on/off status of the climate control system 62 is communicated to the vehicle controller 26, and can be based on, for example, the status of an operator actuated switch, or the automatic control of the climate control system 62 based on related functions, such as window defrost. The climate control system 62 may be connected to the user interface 60 to permit a user to set a temperature for the cabin, or pre-program a temperature for a future operating cycle of the vehicle.

The vehicle 22 includes a secondary battery 68, such as a 12-volt battery, according to one embodiment. The secondary battery 68 may be used to power various vehicle accessories such as headlights and the like, which are collectively referred to herein as accessories 70. A DC-to-DC converter 72 may be electrically disposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70.

The vehicle 22 includes an AC charger 76 for charging the main battery 50. An electrical connector 78 connects the AC charger 76 to an external power supply (not shown) for receiving AC power. The AC charger 76 includes power electronics used to convert, or "rectify" the AC power received from the external power supply to DC power for charging the main battery 50. The AC charger 76 is configured to accommodate one or more conventional voltage sources from the external power supply (e.g., 110 volt, 220 volt, two phase, three phase, level 1, level 2, etc.) In one or more embodiments, the external power supply includes a device that harnesses renewable energy, such as a photovoltaic (PV) solar panel, or a wind turbine (not shown).

Also shown in FIG. 1 are simplified schematic representations of a driver controls system 80, a power steering system 82, and a navigation system 84. The driver controls system 80 includes braking, acceleration and gear selection (shifting) systems. The braking system includes a brake pedal, position sensors, pressure sensors, or some combination thereof, as well as a mechanical connection to the vehicle wheels, such as the primary drive wheels 40, to effect friction braking. The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the vehicle controller 26. The gear selection system includes a shifter for manually selecting a gear setting of the gearbox 38. The gear selection system may include a shift position sensor for providing shifter selection information (e.g., PRNDL) to the vehicle controller 26.

The navigation system 84 may include a navigation display, a global positioning system (GPS) unit, a navigation controller and inputs (all not shown) for receiving destination information or other data from a driver. The navigation system may be integrated with the user interface 60 in some embodiments. The navigation system 84 may also communicate distance and/or location information associated with the vehicle 22, its target destinations, or other relevant GPS waypoints.

Figure 2:
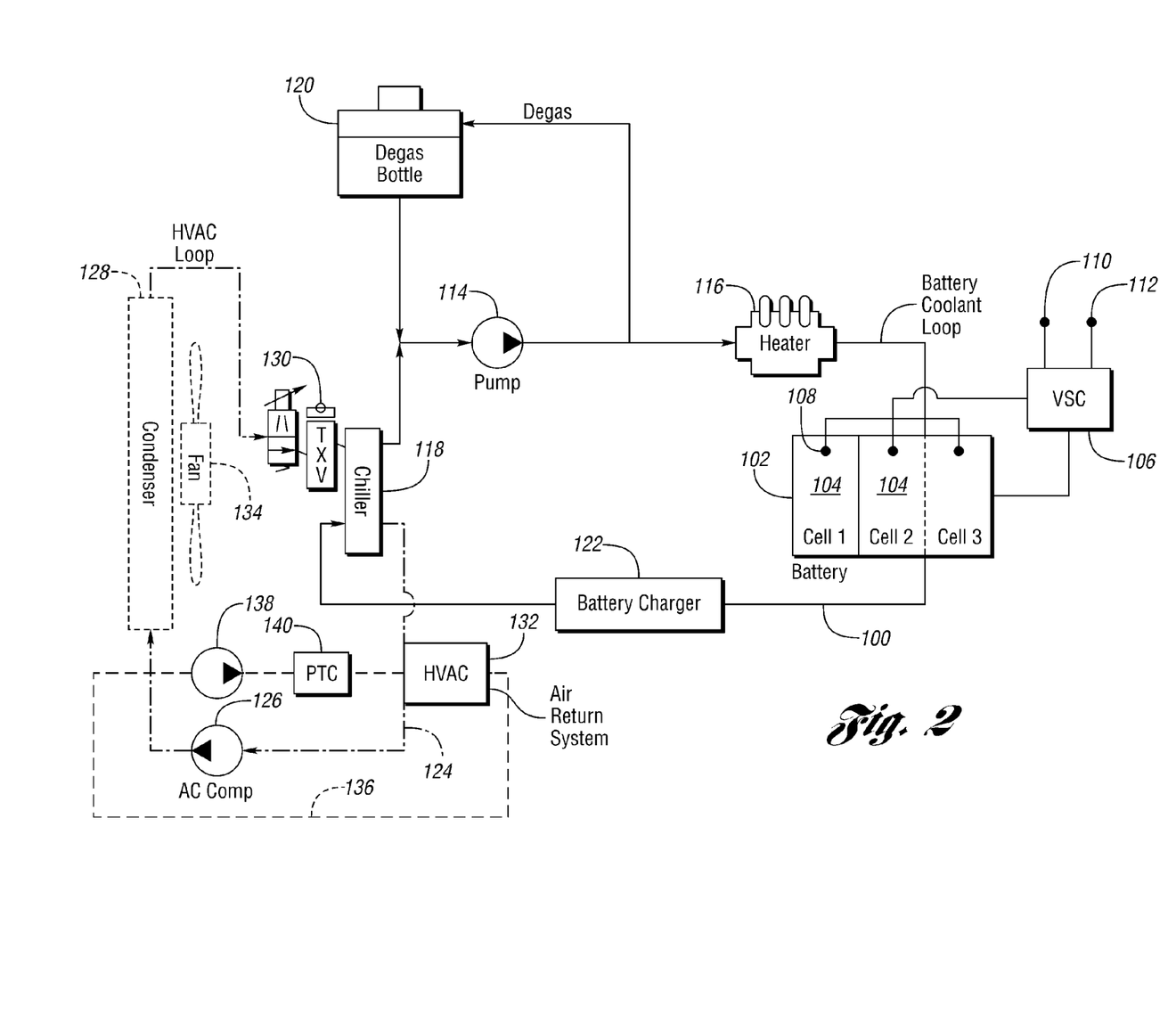
FIG. 2 is a schematic of a battery thermal management cycle according to an embodiment.

FIG. 2 illustrates a thermal cycle or loop for use with vehicle 20 as shown in FIG. 1. The battery thermal cycle 100 may heat and cool the traction battery 102. The traction battery 102 is made up of one or more battery packs, and a battery 102 having one pack is shown in FIG. 2. Each battery pack may have multiple cells. The battery 102 in FIG. 2 has three cells 104, although any number of cells may be used with a battery 102 as is known in the art.

The controller 106, which may be a vehicle controller in communication with or integrated with the battery control module, monitors the battery 104 to determine the state of charge and capacity of the battery 102. Each cell 104 may have an associated temperature sensor 108 that is configured to measure the cell temperature. The temperature sensor 108 is in communication with the controller 106 such that the controller 106 also monitors the battery temperature by monitoring each cell temperature. The controller 106 determines the temperature of the battery 104 by measuring or estimating the temperatures of the various battery cells.

The controller 106 is also in communication with an ambient temperature sensor 110 on the vehicle. The ambient temperature sensor is configured to measure the temperature of the ambient environment. A cabin temperature sensor 112 is also in communication with the controller 110 and measures the temperature of the vehicle passenger cabin to provide feedback for the HVAC system for climate control of the cabin.

The battery 102 may have its temperature actively regulated using the thermal cycle 100 that is controlled by controller 110. The temperature of the battery and of each cell determines the amount of charge that the battery can accept and the amount of charge that can be used when stored in the battery.

The thermal cycle 100 thermally manages the battery 102 to regulate cell 104 temperatures to maintain the battery 102 useful life, permit a proper charge, and meet vehicle performance attributes. The thermal cycle 100 provides active heating or active cooling via liquid heat transfer for the battery 102. The battery thermal cycle 100 may be integrated into a vehicle thermal system having both climate control heating and cooling elements and powertrain cooling elements.

The thermal cycle 100 contains a fluid that cycles through cooling channels adjacent to the cells 104 in the battery to heat or cool the battery 102 using primarily convective heat transfer. A pump 114 controls the flow of the fluid in the cycle 100. A heating element 116 acts as a thermal source for the fluid to heat the fluid and in turn to actively heat the battery 102. The heating element may be a heat exchanger with another thermal system in the vehicle to recover waste heat, or may be a stand-alone heater, such as an electrically powered heater including a positive thermal coefficient (PTC) heater.

The battery thermal cycle 100 also has a chiller element 118, or thermal sink, that cools the fluid which in turn actively cools the battery 102. The chiller may be part of a vapor compression or absorption cycle, a heat exchanger with another element in the vehicle thermal systems, or other thermal sink as is known in the art. Heat exchangers in the system may be co-flow, counterflow or other heat exchangers as are known in the art to appropriately heat or cool the fluid in the cycle 100.

The cycle 100 has a degas bottle to trap vapors in the fluid in the cycle 100 and increase the thermal efficiency of the cycle 100. The degas bottle 120 may be an air trap, separator, or other device as is known in the art. The degas bottle 120 may also act as a fill location to add additional fluid to the cycle 100 as needed, such as during a service event.

The battery thermal cycle 100 may also flow through the battery charger 122 to actively heat or cool the charger 122 and charging components.

The air conditioning cycle 124 of the HVAC system for the vehicle, or climate control system for the vehicle passenger cabin, is illustrated as having a common chiller with the battery cycle 100. Of course, the air conditioning cycle 124 may be separate from the battery cycle 100, more integrated with the battery cycle 100, or have other system architectures. The air conditioning cycle 124 has a fluid loop with a compressor 126, a condenser 128, a throttle 130, and the chiller 118 to provide cooled fluid to the HVAC air return system 132 to provide cool air to the cabin vents. Air flows over the condenser 128 from a fan 134.

A heating system 136 is also provided for the HVAC system 132. A heating loop 136 may be integrated with the air conditioning loop 124, the battery thermal cycle 100, or be a separate system. The heating cycle 136 may be a fluid cycle or an air based cycle or inlet to the HVAC system 132. In one embodiment, the thermal cycle 136 is an air based system with a fan 138 and a PTC heater 140 that provides warm air to the HVAC system 132. The heating system may have a return loop to reheat cabin air, and may also have a fresh air intake to add additional outside air to the cabin.

Figure 3:
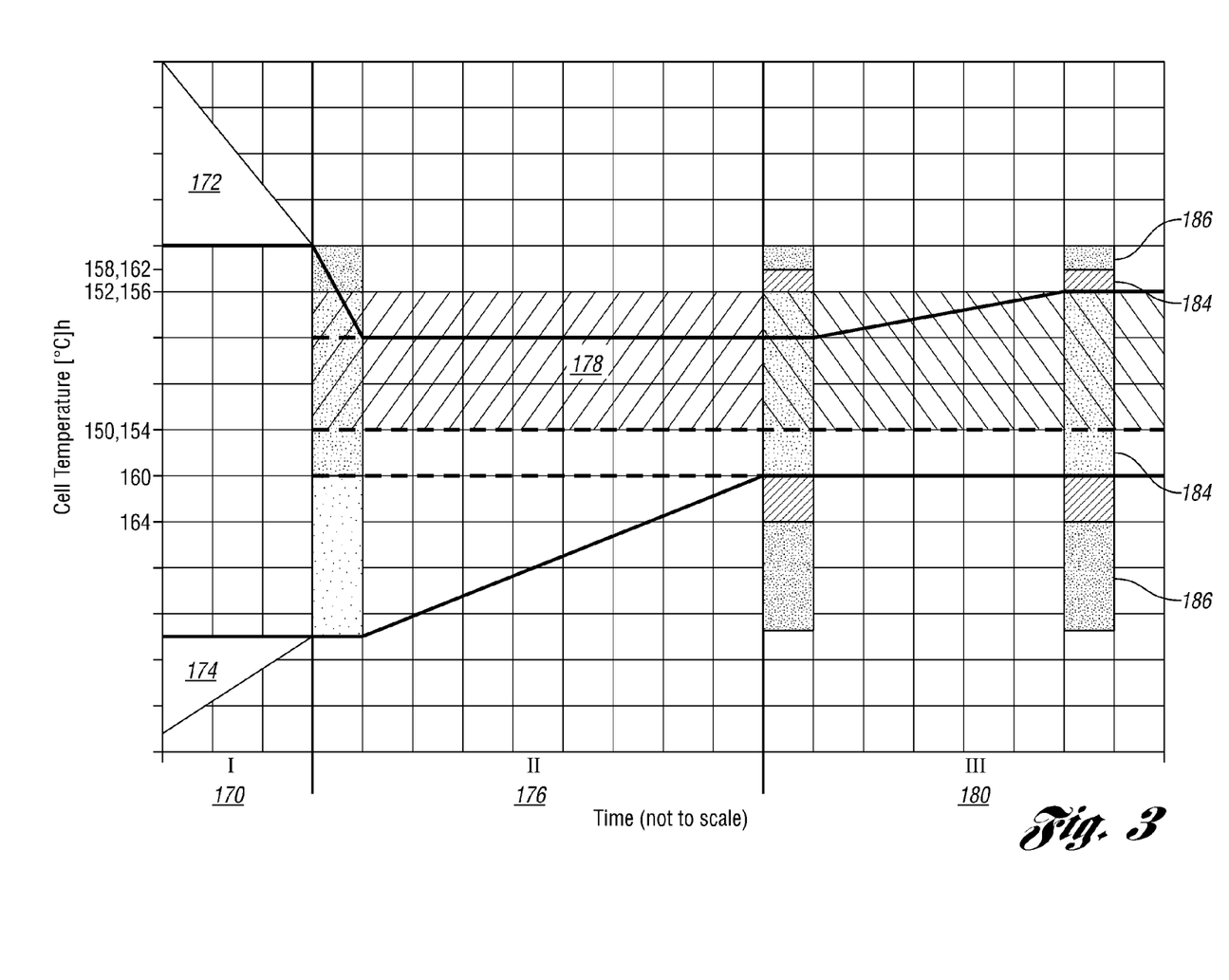
FIG. 3 is a chart illustrating various temperature thresholds for stages of vehicle battery charging and vehicle operation.

A chart illustrating the various temperature thresholds with respect to various charging and discharging phases of battery operation is illustrated in FIG. 3. The various temperature thresholds are chosen based on the battery chemistry, regulations or guidelines, and other considerations. Although some temperature thresholds are shown as having the same value, this may not be true as changes in battery systems, etc. may change not only the value of the threshold, but the values of the thresholds relative to one another. Generally, low temperature thresholds are in the range of 10 degrees Celsius to −40 degrees Celsius. The high temperature thresholds are in the range of 30 degrees Celsius to 60 degrees Celsius.

The Min_Oper_Temp 150 is the low temperature threshold at which the battery operates without active heating provided from the thermal cycle 100, or passive heating from the battery itself. The Max_Oper_Temp 152 is the highest temperature at which the battery operates without cooling provided from the thermal cycle 100. The Min_Oper_Temp 150 and the Max_Oper_Temp 152 together define an operating temperature range for the battery.

The Cold_Amb_Chg_T 154 is the battery target temperature for obtaining a full charge of the battery in a cold ambient temperature and delivering normal operating performance to the vehicle. The Hot_Amb_Chg_T 156 is the battery target temperature for obtaining a full charge of the battery in a hot ambient temperature and delivering normal operating performance to the vehicle. The Cold_Amb_Chg_T 154 and the Hot_Amb_Chg_T 156 together define a charging temperature range for the battery.

Reduced_T_Hot 158 is a warm battery temperature at which the propulsion system will begin providing vehicle operation with reduced performance due to the battery chemistry changing at or above that temperature. The Reduced_T_Cold 160 is a cold battery temperature at which the propulsion system will begin providing vehicle operation with reduced performance due to the battery chemistry changing at or below that temperature. When the battery temperature is outside these temperatures (i.e. warmer than Reduced_T_Hot 158 or colder than Reduced_T_Cold 160), the controller may de-rate the power available to the motor to propel the vehicle either linearly or non-linearly, and operate in a reduced power setting. The controller may provide a user notice through the user interface to inform the user of the limited available power state.

The Limited_T_Hot 162 is a warm battery temperature and may be a higher temperature than the Reduced_T_Hot 158. At Limited_T_Hot 162, the propulsion system may not have sufficient power to meet the limited performance thresholds discussed above. Limited_T_Cold 164 is a cold battery temperature and may be a lower temperature than the Reduced_T_Cold 160. At Limited_T_Cold 164, the propulsion system may not have sufficient power to meet the limited performance thresholds discussed above. When the battery temperature is outside the Limited_T_Hot 162 and Limited_T_Cold 164, the battery power may not be able to provide sufficient power to both propel the vehicle and operate the climate control system. The controller may further de-rate the power available to the motor to propel the vehicle either linearly or non-linearly, and operate in a limited power limit setting. The controller may provide a user notice through the user interface to inform the user of the limited available power state.

The ambient temperature may also be measured to provide an environmental temperature range, where the controller conditions the battery or the cabin in preparation for vehicle operation in conditions outside the environmental range, or uses the Cold_Amb_Chg_T 154 and Hot_Amb_Chg_T 156 thresholds to control the battery temperature when charging in conditions outside the environmental range.

Phase I at 170 of the battery is when the vehicle is connected to the battery charger and outside power source to charge the battery. In one example, the vehicle has not been recently operated or connected to charge. If the battery temperature is above and below specified thresholds, such as a Cold_Amb_Chg_T and Hot_Amb_Chg_T, as shown in FIG. 3 by regions 172 and 174, the controller may prioritize heating or cooling the battery to within those limits before beginning a charge cycle to protect the battery. The thermal cycle will heat or cool the battery as necessary to initiate a charging cycle. If the vehicle is not connected to a charger and power source and the battery temperature begins to approach regions 172, 174, the controller may be configured to send a notice to the user to alert them of a hot or cold battery state and recommend connecting to charge and thermally regulate the battery.

Phase II at 176 of the battery is when the vehicle is connected to the charger and outside power supply and the battery is charging or the battery temperature or cabin temperature is being conditioned in preparation for vehicle operation. The controller may regulate the battery temperature to within the Cold_Amb_Chg_T and Hot_Amb_Chg_T temperature limits, as shown by region 178.

Phase III at 180 of the battery is when the vehicle is operating. The controller may regulate the battery temperature to within the temperature limits Min_Oper_Temp 150 and the Max_Oper_Temp 152, as shown by region 182 where the vehicle operates normally.

When the battery temperature is below Reduced_T_Cold or above Reduced_T_Hot, as shown by regions 184, the performance of the vehicle may be reduced or the controller may limit the performance due to the thermal state of the battery.

When the battery temperature is below Limited_T_Cold or above Limited_T_Hot, as shown by regions 186, the performance of the vehicle may be further reduced or the controller may further limit the performance due to the thermal state of the battery.

Figure 4:
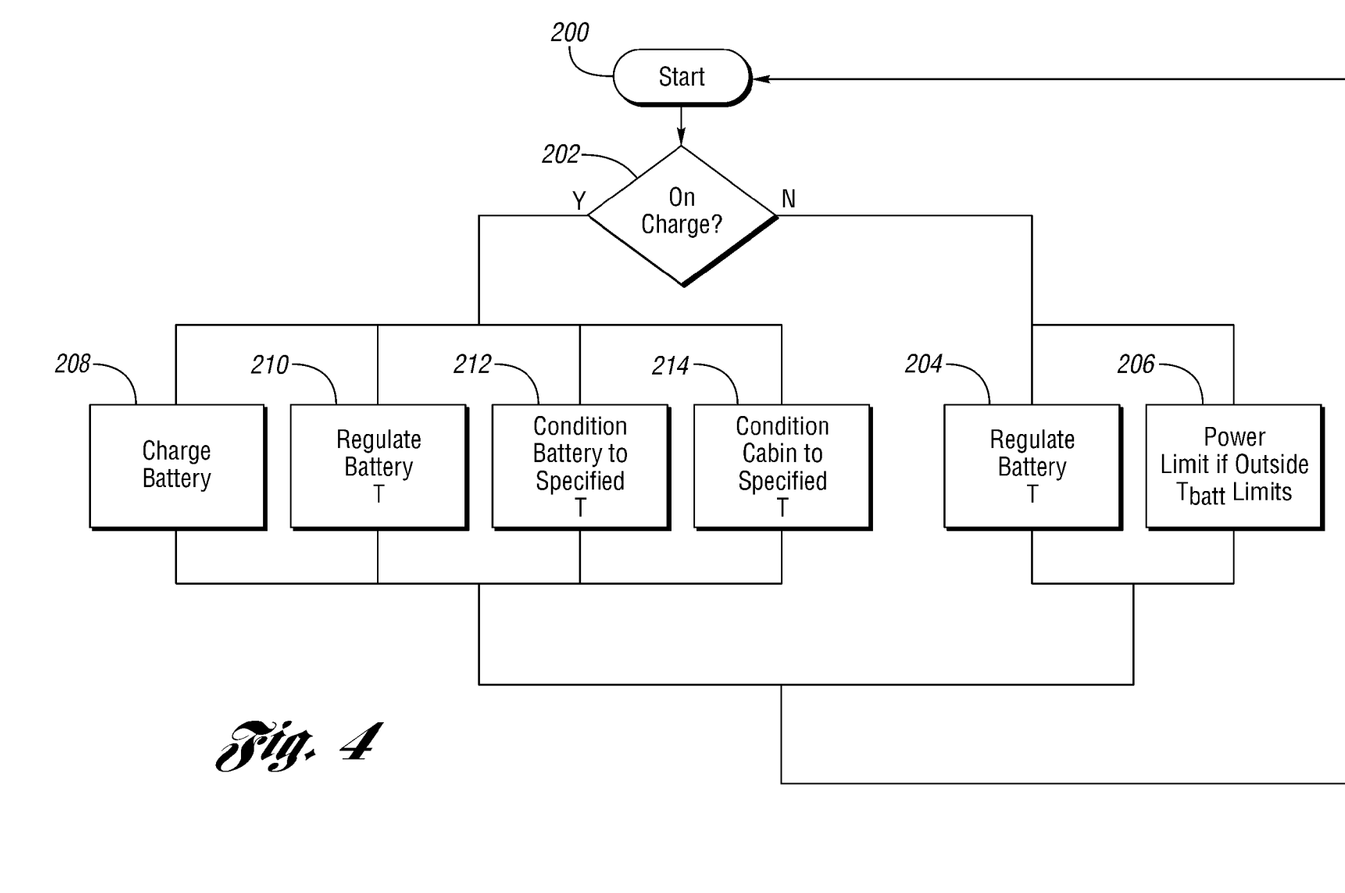
FIG. 4 is a flow chart illustrating an overall control algorithm for the thermal management of the battery.

An overall control algorithm for thermal management of the vehicle is shown in FIG. 4. The controller initiates the algorithm at 200. The controller then determines if the vehicle is connected to a charger and power source at 202. If the battery is not connected to a charger and power source, and the vehicle is operating, the controller regulates the battery temperature at 204 using the thermal cycle to maintain the battery temperature to within a battery temperature operating range. If the thermal cycle cannot maintain the battery temperature to within the operating range, the controller may need to limit the vehicle performance at 206 based on limited battery power available at that battery temperature.

If the battery is connected to a charger and power source, the controller arbitrates between several functions. The controller may charge the battery at 208 if the battery state of charge is lower than a threshold. The controller may regulate the battery temperature at 210 to with a charging temperature range. The controller may condition the battery at 212 by heating or cooling the battery to a specified temperature in preparation for vehicle operation in a hot or cold temperature environment.

Regulating the battery temperature at 210 while the vehicle is connected to a charger and power source may serve to protect the battery and preserve the battery life, permit the battery to accept a full available charge to a maximum state of charge, and provide a high level of vehicle performance when the vehicle is operated after disconnecting from the charger and power source.

The battery may be conditioned at 212 to a warm temperature threshold when there is a cold ambient temperature (or likewise to a cold temperature threshold when there is a warm ambient temperature) to increase vehicle performance and range. For example, when the battery is conditioned to a warm temperature near the upper limit of its operating range, it will take longer for the battery to cool below the low operating temperature limit if the vehicle is parked at a destination for the user in a cold ambient temperature environment.

The controller may also condition the cabin at 214 by heating or cooling the cabin to a specified temperature in preparation for vehicle operation. Cabin conditioning may increase the vehicle range, as well as provide improved comfort levels for the user.

Conditioning the battery and the cabin 212, 214 using outside power provided by the charger offsets battery power that would be required to heat or cool the battery or the cabin when the vehicle is operating and the amount of available energy is limited to that contained in the battery. The controller arbitrates the various functions based on input charge available, the state of the battery, an ambient temperature, a known departure time and user inputs, and other factors.

Figure 5A:
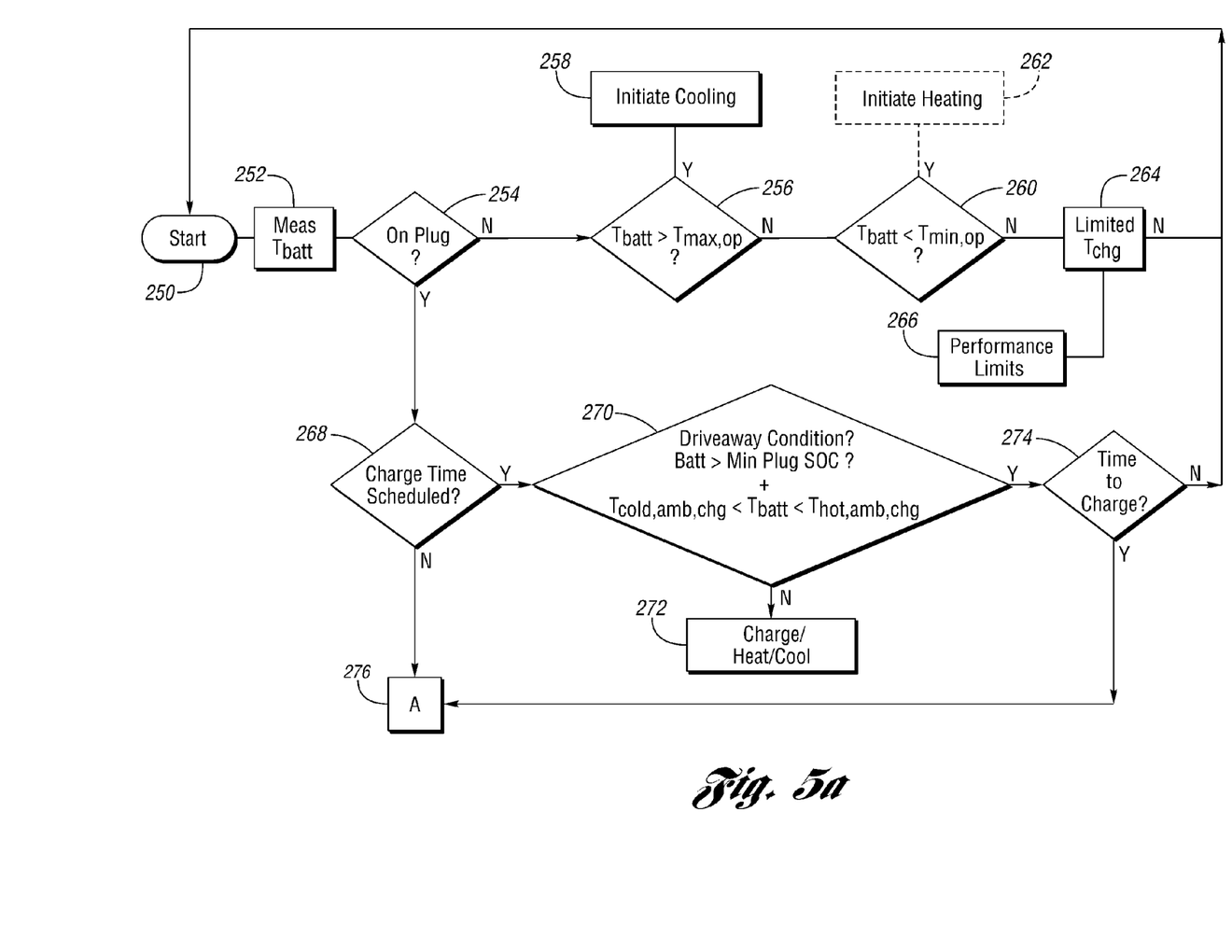
FIGS. 5a and 5b are a flow chart of a control algorithm for the thermal management of the battery according to an embodiment.
Figure 5B:
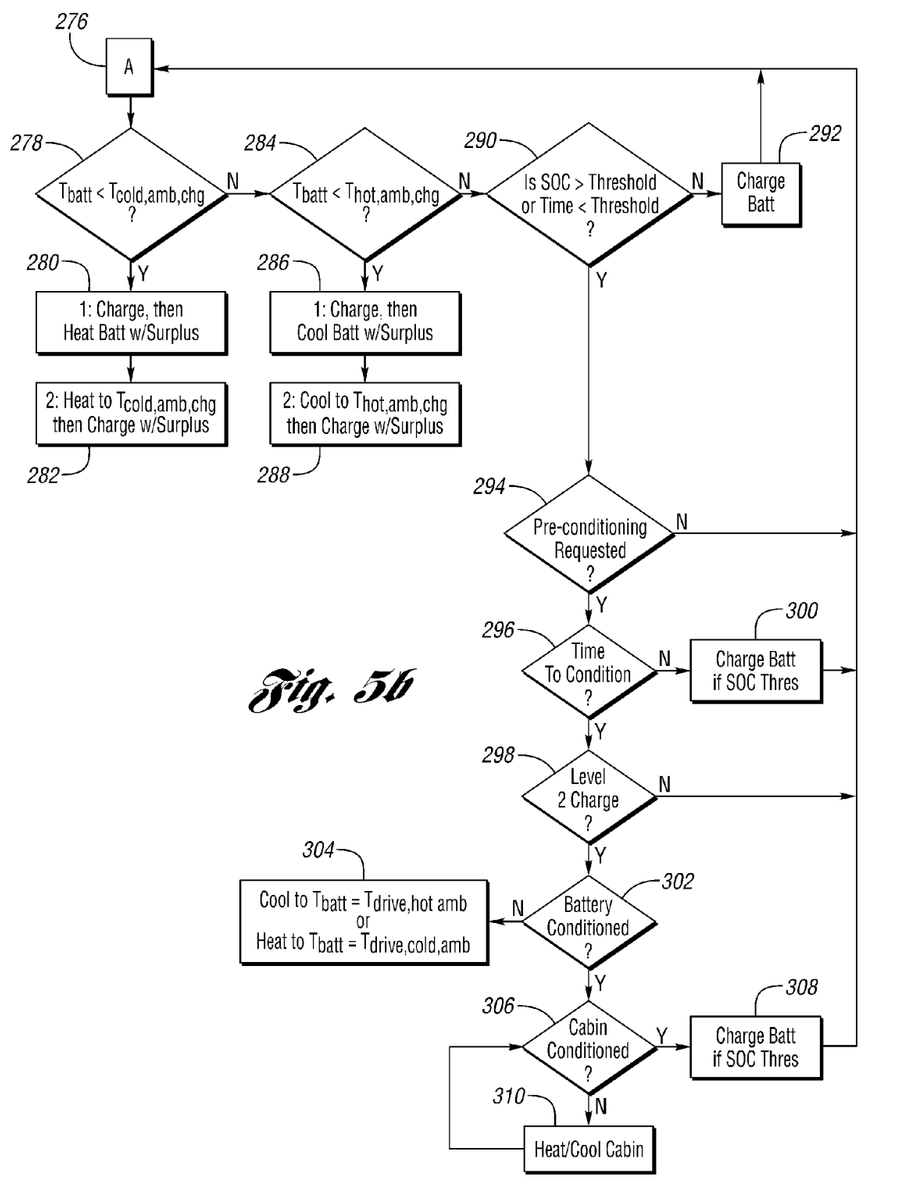

FIGS. 5a and 5b illustrate an embodiment of the overall algorithm as described with respect to FIG. 4. Of course, other combinations and priorities are contemplated for use by the controller, and the embodiment in FIG. 5 is not limiting to the disclosure.

The controller initiates the algorithm at 250. The temperature of the battery is measured using temperature sensors in the various battery cells at 252, or alternatively, the temperature of the battery may be estimated. The controller may also measure the ambient temperature at this step. The controller may average the temperature measurements of all of the cells to obtain an average battery temperature. Alternatively, the controller may use the most limiting cell temperature when the ambient temperature as measured by the controller is outside an environmental temperature range. For example, if it was a cold day and the ambient temperature was below the environmental range, the controller may use the temperature of the coldest cell in the battery as the overall battery temperature. Conversely, on a warm day, and the ambient temperature was above the environmental range, the controller may use the temperature of the warmest cell in the battery as the overall battery temperature.

The controller then determines if the battery and the vehicle are connected to an outside power source and is capable of charging at 254. During this step, the controller may also determine the type of input voltage that the charger is connected to, such as 110 V, 220 V, phase, etc.

If the battery is not connected to charge, and the vehicle is operating, the controller determines if the battery temperature is above its maximum operating temperature, Max_Oper_Temp, at 256. If it is, the controller will command the battery thermal cycle to cool the battery to lower the temperature at 258.

If the battery temperature is not above its maximum operating temperature, Max_Oper_Temp, at 256, the controller proceeds to step 260. At 260, the controller determines if the battery temperature is below the Min_Oper_Temp. If it is, the controller may command the battery thermal cycle to heat the battery to raise the temperature at 262. Alternatively, the controller may permit passive heating of the battery where the chemistry and charging process produce heat that raises the battery temperature without using the active heating from a thermal cycle.

The controller also checks the battery temperature against the Reduced_T_Hot and Reduced_T_Cold limits, and the Limited_T_Hot and Limited_T_Cold limits at 264. If the battery temperature is outside these limits, the controller may limit the vehicle performance, climate control system, or both at 266, as the battery power output is also reduced or limited.

If the battery is connected to the charger and power source at 254, the controller determines if a charge time has been scheduled at 268. A charge time may have been scheduled by a user using the user interface, selected based on an algorithm for low cost per kilowatt-hour, or otherwise input into or scheduled by the controller. If a charge time has not been scheduled the controller proceeds to 276.

If a charge time has been scheduled at 268, the controller determines if the vehicle is in a driveaway condition at 270. A driveaway condition is when the battery state of charge is above a minimum state of charge level for a battery connected to outside power. The driveaway condition may also include the temperature of the battery being within a charging temperature range, such as between Cold_Amb_Chg_T and Hot_Amb_Chg_T. If the battery is not in a driveaway condition, the controller places it in a driveaway condition at 272 by charging the battery to above the required state of charge level and/or heating or cooling the battery such that the battery temperature is within the desired temperature range. The controller then determines if it is time to charge, or that the scheduled time to charge is occurring at 274. If it is not time to charge, the controller returns to 250. If it is time to charge based on the schedule, the controller proceeds to 276.

Referring now to FIG. 5b, and step 276, the controller begins a charging cycle since the battery is connected to the charger and power source. The controller determines if the battery temperature is less than a minimum charging temperature, such as Cold_Amb_Chg_T, at 278. If the battery temperature is less than the minimum charging temperature, the controller prioritizes charging and heating the battery differently based on the charging voltage input from the charger.

At a first voltage, such as 110 V or level 1, the charger uses the available charging energy to charge the battery at 280. Any remaining energy that is not being used to charge the battery, is used to regulate the battery temperature by heating the battery using the thermal cycle at 280.

At a second voltage, such as 220 V or level 2, the charger uses the available charging energy to regulate the battery temperature by heating the battery to the minimum charging temperature using the thermal cycle at 282. Any remaining energy that is not being used to heat the battery is used to charge the battery at 282. Once the battery reaches the minimum charging temperature, the energy from the charger is primarily used to charge the battery.

Since a limited amount of energy is available with the first voltage input at 280, the priority is placed on charging the battery. At a higher voltage input at 282, the priority can be shifted to using energy to heat the battery, and there is sufficient energy remaining to charge the battery as well.

If the battery temperature is not less than the minimum charging temperature, the controller proceeds to step 284 where it determines if the battery temperature is greater than a maximum charging temperature, such as Hot_Amb_Chg_T. If the battery temperature is greater than the maximum charging temperature, the controller prioritizes charging and heating the battery differently based on the charging voltage input from the charger.

At a first voltage, such as 110 V or level 1, the charger uses the available charging energy to charge the battery at 286. Any remaining energy that is not being used to charge the battery is used to regulate the battery temperature by cooling the battery using the thermal cycle at 286.

At a second voltage, such as 220 V or level 2, the charger uses the available charging energy to regulate the battery temperature by cooling the battery to the maximum charging temperature using the thermal cycle at 288. Any remaining energy that is not being used to cool the battery is used to charge the battery at 288. Once the battery reaches the maximum charging temperature, the energy from the charging is primarily used to charge the battery.

Since a limited amount of energy is available with the first voltage input at 286, the priority is placed on charging the battery. At a higher voltage input at 288, the priority can be shifted to using energy to cool the battery, and there is sufficient energy remaining to charge the battery as well.

If the controller determines that the battery temperature is not less than a minimum charging temperature or greater than a maximum charging temperature, then the temperature is within the charging temperature range and the controller proceeds to 290. At 290, the controller determines if the state of charge of the battery is greater than a threshold, such as a maximum battery charge level, or some predetermined percentage thereof. The controller also determines at 290 if the vehicle is scheduled for operation within a predetermined time period, such as a scheduled drive or likelihood of driving determined from pattern recognition within the next hour, half an hour, etc.

If the state of charge is less than a charge threshold or the time to drive is greater than a time period threshold, the controller proceeds to 292 where the controller commands the charger to charge the battery if the state of charge is less than the charge threshold. The controller then returns to 276.

If the state of charge is greater than a charge threshold or the time to drive is less than a time period threshold, the controller proceeds to 294. At 294, the controller determines if pre-drive conditioning or preconditioning was requested or scheduled. Conditioning may be requested or input by a user using the user interface, where the user inputs the desire to precondition the battery or sets a desired cabin temperature. Pre-drive conditioning may also be determined from pattern recognition, including driver habits and ambient temperatures. If conditioning was not requested, the controller returns to 276.

If conditioning was requested at 294, the controller proceeds to 296. If it is time to begin the conditioning the controller proceeds to 298. Time to begin the conditioning may be related to the scheduled drive time, and may also include factors such as the ambient temperature and the time necessary to condition the battery to the desired temperature, or for the HVAC system to condition the cabin from its present temperature to the desired temperature.

If it is not time to begin the conditioning the controller proceeds to 300. At 300, the battery is charged if the state of charge is less than the charge threshold, and then the controller returns to 276.

At 298, the controller uses the determination of the charging voltage input, and if the charge voltage is sufficient, such as level 2 or 220 V, the controller goes to 302 to determine if the battery is conditioned.

If the battery is not conditioned the controller goes to 304 and commands the thermal cycle to condition the battery to a specified temperature using energy from the charger. When the ambient temperature is outside an environmental temperature range, there is a high likelihood that the battery will need to be heated or cooled based on the additional thermal effect on the battery temperature from the environment. If the battery is not preconditioned, energy from the battery will be used to cool or heat the battery when the vehicle operates. By preconditioning the battery, energy used for heating or cooling the battery for the start of the trip has come from the charger and outside power source, and less energy is then required from the battery to thermally regulated the battery temperature while the vehicle is driving.

For example, on a warm day, when the ambient temperature is greater than the upper end of the environmental temperature range, the controller will command the thermal cycle to cool the battery to a predetermined temperature, which may be approximately at or near the low temperature operating limit of the battery. On a cool day, when the ambient temperature is less than the lower end of the environmental temperature range, the controller will command the thermal cycle to heat the battery to a predetermined temperature, which may be approximately at or near the high temperature operating limit of the battery. This process is conditioning the battery. In some embodiments, the battery may be slightly heated or cooled outside its normal operating temperature range in anticipation of the thermal effect of the environment on the battery once the vehicle begins to operate.

If the battery is conditioned at 302, the controller proceeds to 306 and determines if the cabin is conditioned. If the cabin is not conditioned, the controller commands the HVAC system to heat or air condition the cabin to the desired cabin temperature using energy from the charger at 308.

If the cabin is conditioned or is at or near its desired temperature, the battery is charged if the state of charge is less than the threshold at 308, and then returns to 276.

Although the cabin preconditioning steps are shown as preceding the battery conditioning steps, it is contemplated that the order of these may be reversed, or that they may proceed in parallel with one another.

Regulating the battery temperature permits both a larger amount of energy to be stored in the battery when charging and more available energy from battery when operating due to the battery chemistry. Conditioning the battery to a specified temperature while the vehicle is charging causes higher energy efficiency later for the vehicle as less battery energy may be needed to thermally manage the battery and more may be directed for propulsion, thereby extending the vehicle range. Conditioning the cabin to a specified temperature while the vehicle is charging causes higher energy efficiency later for the vehicle as less battery energy may be needed to heat or cool the cabin and more may be directed to propelling the vehicle, also increasing the vehicle range.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined, sequenced, or prioritized to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A method for thermal management of an electric vehicle comprising:
    detecting if a traction battery is connected to a charger and power source;
    measuring a temperature of individual cells in the traction battery to provide a traction battery temperature, wherein each individual cell has an associated temperature sensor;
    regulating the temperature of the traction battery to be within an operating temperature range when the vehicle is operating;
    regulating the temperature of the traction battery to be within a charging temperature range when the traction battery is connected to the charger and power source;
    preconditioning the traction battery to a traction battery drive temperature when ambient temperature is outside an environmental temperature range and the traction battery is connected to the charger and power source; and
    preconditioning a cabin in the vehicle to a cabin temperature when the vehicle is connected to the charger and power source and the ambient temperature is outside the environmental temperature range.

2. The method of claim 1 further comprising charging the traction battery when the traction battery is connected to the charger and power source and a state of charge is less than a threshold.

3. The method of claim 2 wherein charging the traction battery and regulating the traction battery temperature are prioritized over preconditioning the traction battery and preconditioning the cabin.

4. The method of claim 2 wherein preconditioning the traction battery and preconditioning the cabin is prioritized over charging the traction battery and regulating the traction battery temperature.

5. The method of claim 1 wherein preconditioning the traction battery is prioritized over preconditioning the cabin.

6. The method of claim 1 wherein the temperature of the traction battery is an average of the cell temperatures.

7. The method of claim 1 wherein the temperature of the traction battery is a limiting cell temperature when the ambient temperature is outside the environmental temperature range.

8. The method of claim 1 wherein the temperature of the traction battery is regulated when the traction battery is connected to the charger and power source to prevent a limited power output from the traction battery when the vehicle is operating.

9. The method of claim 1 wherein the temperature of the traction battery is preconditioned such that the traction battery drive temperature is higher than ambient temperature to decrease energy consumption by the vehicle when operating.

10. The method of claim 1 wherein the temperature of the traction battery is preconditioned such that the traction battery drive temperature is lower than ambient temperature to maintain power availability from the traction battery of the vehicle when operating.

11. The method of claim 1 wherein the cabin is preconditioned to decrease energy consumption of the vehicle when operating.

12. The method of claim 1 further comprising limiting a vehicle power output when the traction battery temperature is outside the operating temperature range when the vehicle is operating.

13. An electric vehicle comprising:

a traction battery;

a temperature sensor for the traction battery;

a thermal cycle connected to the traction battery and having a thermal source and a thermal sink; and a controller connected to the traction battery, the sensor, and the thermal cycle, the controller configured to (i) measure a traction battery temperature using the sensor, (ii) detect if the traction battery is connected to a charger and power source, (iii) charge the traction battery when the traction battery is connected to the charger and power source and a state of charge is less than a threshold, (iv) regulate the temperature of the traction battery to within a charging temperature range when the traction battery is connected to the charger and power source, (v) precondition the traction battery to a battery drive temperature when the ambient temperature is outside an environmental temperature range, and (vi) limit a vehicle power output when the traction battery temperature is outside an operating temperature range and the vehicle is operating.

14. The electric vehicle of claim 13 further comprising a cabin climate control system in communication with the thermal cycle; and wherein the controller is configured to precondition a cabin in the vehicle to a cabin temperature when the vehicle is connected to the charger and power source.

15. The electric vehicle of claim 13 wherein the controller is configured to regulate the temperature of the traction battery to within an operating temperature range when the vehicle is operating.

* * * * *